United States Patent
Zhang et al.

(10) Patent No.: US 12,335,148 B2
(45) Date of Patent: Jun. 17, 2025

(54) LINKED PACKET TRACING FOR SOFTWARE LOAD BALANCERS

(71) Applicant: eBay Inc., San Jose, CA (US)

(72) Inventors: Bo Zhang, Pudong District (CN); Shenghui Yang, Pudong New District (CN); Bin Sun, Pudong New District (CN); Nanxiang Mei, Pudong New District (CN); Charles Li, Sunnyvale, CA (US)

(73) Assignee: eBay Inc., San Jose, CA (US)

( * ) Notice: Subject to any disclaimer, the term of this patent is extended or adjusted under 35 U.S.C. 154(b) by 319 days.

(21) Appl. No.: 17/705,748

(22) Filed: Mar. 28, 2022

(65) Prior Publication Data
US 2023/0308392 A1 Sep. 28, 2023

(51) Int. Cl.
*H04L 47/125* (2022.01)
*H04L 47/193* (2022.01)
(Continued)

(52) U.S. Cl.
CPC .......... *H04L 47/125* (2013.01); *H04L 47/193* (2013.01); *H04L 47/2408* (2013.01); *H04L 47/2483* (2013.01)

(58) Field of Classification Search
None
See application file for complete search history.

(56) References Cited

U.S. PATENT DOCUMENTS

| 9,088,611 B2 | 7/2015 | Jagadeeswaran et al. |
| 9,432,245 B1 | 8/2016 | Sorenson et al. |

(Continued)

FOREIGN PATENT DOCUMENTS

| CN | 101252591 | 8/2008 |
| CN | 103297552 | 9/2013 |

(Continued)

OTHER PUBLICATIONS

PCT/US23/16533, "International Search Report and Written Opinion", PCT Application No. PCT/US23/16533, Jul. 10, 2023, 11 pages.

(Continued)

*Primary Examiner* — Srinivasa R Reddivalam
(74) *Attorney, Agent, or Firm* — FIG. 1 Patents

(57) ABSTRACT

Linked packet tracing techniques for software load balancers are described, as leveraging a client identifier generated to link packet traces between packets of a service provider system. In one example, a client-side packet is received from a client device by a processing system. From this, a client identifier is generated by the processing system based on the client device. In response, a modified client-side packet is generated by the processing system by modifying the client-side packet to include the client identifier. The modified client-side packet is transmitted by the processing system to a server system. A server-side packet is then received by the processing system from the server system. In response, the server-side packet is detected as including the client-identifier. From this, the server-side packet is linked to at least the modified client-side packet based on the detecting, and the processing system outputs a result of the linked packets.

20 Claims, 10 Drawing Sheets

(51) Int. Cl.
*H04L 47/2408* (2022.01)
*H04L 47/2483* (2022.01)

(56) References Cited

U.S. PATENT DOCUMENTS

| | | | |
|---|---|---|---|
| 11,606,273 B1* | 3/2023 | Kumar | H04L 43/087 |
| 2007/0291662 A1* | 12/2007 | Mangin | H04L 69/163 |
| | | | 370/252 |
| 2014/0089486 A1* | 3/2014 | Natham | H04L 45/66 |
| | | | 709/223 |
| 2014/0258465 A1 | 9/2014 | Li | |
| 2019/0004780 A1 | 1/2019 | Arumugam et al. | |
| 2020/0302216 A1* | 9/2020 | He | H04L 47/2441 |
| 2021/0400167 A1* | 12/2021 | Heitz, III | H04N 1/465 |
| 2023/0125661 A1* | 4/2023 | Jebakumar | G06F 9/4856 |
| | | | 718/1 |
| 2023/0179855 A1* | 6/2023 | Liu | H04N 23/611 |
| | | | 348/222.1 |

FOREIGN PATENT DOCUMENTS

| | | |
|---|---|---|
| CN | 107026890 | 8/2017 |
| CN | 110099115 | 8/2019 |

OTHER PUBLICATIONS 23781675.6, "Foreign Office Action", EP Application No. 23781675.6, Nov. 6, 2024, 3 pages.

* cited by examiner

LINKED PACKET TRACING FOR SOFTWARE LOAD BALANCERS

BACKGROUND

Network communications are foundational to the operation of many different systems and devices. Large public networks (the Internet) or smaller private networks (corporate intranets) facilitate communications between different systems or devices. This includes from clients of services that provide storage, computing, or data delivery to hosting internal web sites or network tools accessible to a small number of users. Such networks utilize large numbers of networking devices to facilitate the fast and reliable delivery of data, using network packets, from one system to another. Leveraging the power of network communications has increased the demand upon networking devices to receive, process, and send network packets. This increased demand has resulted in the growing adoption of software load balancers by service provider systems online, which are increased capabilities of scaling elastically to meet this demand than the conventionally utilized hardware load balancers. However, despite the advantages of software load balancers, increased demand leads also leads to increased demand for effective diagnostic, monitoring, and corrective tools to repair and improve network devices performance using software load balancers.

SUMMARY

Linked packet tracing techniques for software load balancers are described. In one example, a client-side packet is received from a client device by a processing system. From this, a client identifier is generated by the processing system based on the client device. In response, a modified client-side packet is generated by the processing system by modifying the client-side packet to include the client identifier. The modified client-side packet is transmitted by the processing system to a server system. A server-side packet is received by the processing system from the server system. In response, the server-side packet is detected as including the client-identifier. From this, the server-side packet is linked to the modified client-side packet based on the detection. Once the server-side packet and the modified client-side packet are linked, the processing system outputs a result of the linkage. The result is usable to implement variety of different functionality, such as to control load balancing by the software load balancer for the server system for subsequent packets.

This Summary introduces a selection of concepts in a simplified form that are further described below in the Detailed Description. As such, this Summary is not intended to identify essential features of the claimed subject matter, nor is it intended to be used as an aid in determining the scope of the claimed subject matter.

BRIEF DESCRIPTION OF THE DRAWINGS

The detailed description is described with reference to the accompanying figures. Entities represented in the figures are indicative of one or more entities and thus reference is made interchangeably to single or plural forms of the entities in the discussion.

FIG. 9 is a flow diagram depicting a procedure in an example implementation of controlling capture of server-side packets from a server system by generating a packet stream affiliated with an exposed server identifier of a server that a modified client-side packet is being transmitted to.

DETAILED DESCRIPTION

Overview

Figure 1:
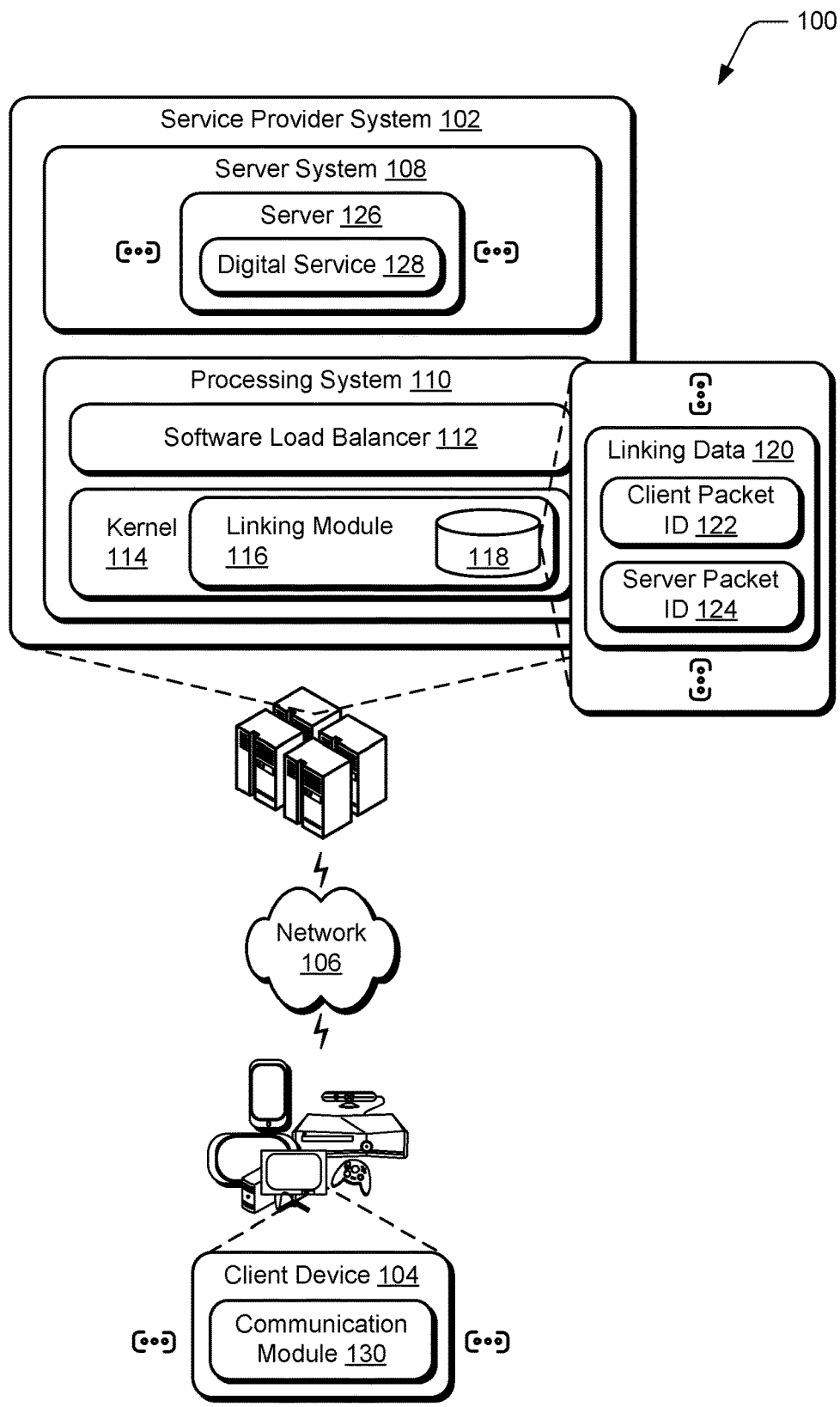
FIG. 1 is an illustration of an environment in an example implementation that is operable to employ linked packet tracing techniques for software load balancers described herein.

The demand upon networking devices to receive, process, and send network packets is ever increasing. Despite the growing adoption of software load balancers, which have increased scaling capabilities to meet this increased demand as opposed to conventional hardware load balancers, this ever-increasing demand leads to an ever-increasing demand for effective diagnostic, monitoring, and corrective tools to repair or improve the performance of networking. Conventional techniques for troubleshooting network communication problems of a service provider system using software load balancers typically result in inefficient and computationally expensive use of computational resources. For instance, capturing each of the server-side packets received from a server system when troubleshooting is inefficient and computationally expensive using conventional techniques.

Accordingly, linked packet tracing techniques and systems for software load balancers are described to trace a journey of a network packet from one device to another across a network, for instance, to identify devices within a service provider system that may not be performing optimally. This results in substantially increased efficiency in network analysis and computational resource consumption.

Consider an example in which a network of a service provider system experiences an operational problem. Conventional techniques used to analyze the network fail to link corresponding packets of a single transaction, and therefore inefficiently fail to simultaneously determine a relationship between more than one Transmission Control Protocol (TCP) connection per a single HyperText Transfer Protocol (HTTP) transaction. This is because conventional techniques fail to enable packet tracing of traffic of a server-side connection that corresponds with packets received from a client-side connection. Conventional techniques also fail to capture packets received from a server system in a targeted manner. The failures of these conventional techniques result in inefficient network analysis and consequently load balancing based on this analysis, and an expensive computational cost that results in user frustration. This is because of the enormous amount of traffic that modern service provider systems receive.

In the following, a processing system implements linking techniques in which a modified client-side packet includes a client identifier to link at least a client-side packet to a corresponding server-side packet. In one example, a client-side packet is received from a client device by a processing system. The processing system is configured to receive the client-side packet at various parts of the processing system, such as at a software load balancer (e.g., Envoy, NGINX, or so forth), at a client-side packet processor module, at a Virtual Internet Protocol address, or so forth.

In response, a client identification module generates a client identifier based on the client device, e.g., based on a client IP address, a client port based on the client device, and so on. The client identifier, for instance, is configurable based on client connection data associated with the client-side packet. In another example, the client identifier is generated as part of ancillary data of the processing system. Additionally, or alternatively, the marking module identifies a client identifier in the client-side packet received from the client device.

From this, a marking module generates a modified client-side packet by modifying the client-side packet to include the client identifier. This modification is performable at a kernel, such as a Linux kernel. In one example, a hook (e.g., netfilter) is leveraged to generate the modified client-side packet. In another example, the client-side packet is modified by adding the client identifier as a new field of the client-side packet. For instance, a Transmission Control Protocol ("TCP") option field or an Internet Protocol ("IP") option field.

The TCP option field of a TCP packet includes zero or thirty two-bit words and provides a way to deal with limitation of the original header of the TCP packet; TCP header size varies in the range of twenty to sixty bytes, where forty bytes is because of option fields, which is located at the end of the TCP header. Conventional TCP options are maximum segment size ("MSS"), window scaling, selective acknowledgement ("SACK"), timestamp, and no options ("NOP"), and conventionally include information relevant to those options. By way of example, a client device conventionally uses the options field to declare an MSS, if applicable.

An IP option field is an optional field of an IP packet that is included in a header of the IP packet. By way of example, an IP option field is included in an IPv4 header used when the value of Internet Header Length is set to greater than five. The IP header includes information such as the IP version, the packet's length, the source, and the destination, and provides essential data needed to transmit the data. The IP option field typically contains values and settings related with security, record route and time stamp, or so forth.

Additionally, or alternatively, the client-side packet is modified by modifying an existing field. For instance, modifying an IP type of service ("ToS") field to include a client IP address corresponding to the client device. The IP ToS field is a field that is included in an IP packet header. For example, as a second byte of a IPv4 header. The IP ToS field can be leveraged to indicate throughput type, reliability type, delay type, and cost.

A packet forwarding module is also configured to transmit the modified client-side packet having the client identifier to a server system. From this, a server-side packet processor module receives a server-side packet from the server system, e.g., from a server of the server system. In one example, the server-side packet is received from the server system based on a called API, such as libpcap.

In response, a detection module detects that the server-side packet includes the client identifier. Once detected, a linking module links the server-side packet to at least the modified client-side packet based on the detection. In one example, the linkage maps client connection data associated with the client-side packet to server connection data associated with the server-side packet. As a result, a user interface module outputs a linking result. Additionally, or alternatively, a load balancing module controls the load balancing of a server system based on the linking of the server-side packet and at least the modified client-side packet. For instance, the load balancing module controls the load balancing by routing traffic to healthy servers of the server system, by not accepting any new handshake requests from client devices, by going offline when doing so will not interrupt an established connection, or so forth.

As a result, the linked packet tracing techniques and systems for software load balancers described herein overcome challenges of conventional techniques with increased user and computational efficiency. Further discussion of these and other examples is included in the following sections and shown in corresponding figures.

In the following discussion, an example environment is described that employs the techniques described herein. Example procedures are also described that are performable in the example environment as well as other environments. Consequently, performance of the example procedures is not limited to the example environment and the example environment is not limited to performance of the example procedures.

Example Environment

FIG. 1 is an illustration of an environment 100 in an example implementation that is operable to employ linked packet tracing techniques described herein. The illustrated environment 100 includes a service provider system 102 and a client device 104, that are communicatively coupled, one to another, via a network 106.

The service provider system 102 is illustrated as including a server system 108 and a processing system 110. The processing system 110 includes a software load balancer 112 and a kernel 114. The software load balancer 112 manages a computational resource load distribution across the server system 108 and as such directly affects the operation of servers of the server system 108. The processing system 110 includes functionality to link packets, such as packets received by the software load balancer 112. The functionality to link packets is implemented at least partially in hardware of the processing system 110, which is illustrated as being maintained by at least the linking module 116 of the kernel 114.

The linking module 116 includes a storage device 118 that includes linking data 120 having a client packet ID 122 and a server packet ID 124. One example of linking data 120 is mapped packet traces between a client device 104, a processing system 110, and a server system 108 of the service provider system 102. Although the linking functionality is illustrated as implemented at the linking module 116 of the kernel 114, functionality of the linking module 116 is also configurable as whole or part via functionality available via the kernel 114, the software load balancer 112, the processing system 110, the service provider system 102, or the network 106, such as part of a web service or "in the cloud."

The processing system 110 includes additional functionality to process packets. Such processing includes generation of client identifiers, generation of modified client-side packets, transmission of modified client-side packets, detection of server-side packets that include a client identifier, output of a result of linking data 120, and so forth.

The server system 108 includes functionality to process packets received from the processing system 110, such as from the software load balancer 112. The server system 108 includes a plurality of servers (a representative example of which is server 126) having the functionality to implement a digital service 128. Examples of a digital service 128 include processing a packet received from the processing system 110, controlling access to a service of the service provider system 102, transmitting packets to a software load balancer 112, and so forth as part of implementing social networks, data sharing systems, and so forth. Digital services 128 further pertain to operation of computational resources (e.g., processing, memory, and network resources) of computing devices that support the access to and management of the service provider system 102. In one example, each of the server 126 of the server system 108 manages operations between client devices 104 and backend services of the service provider system 102, for example, managing data requests and requesting connections to access resources that can fulfill those requests.

The service provider system 102 and the client device 104 are configurable in a variety of ways. The client device 104, for instance, is configurable as a desktop computer, a laptop computer, a mobile device (e.g., assuming a handheld configuration such as a tablet or mobile phone), and so forth. Thus, the client device 104 ranges from full resource devices with substantial memory and processor resources (e.g., personal computers, game consoles) to a low-resource device with limited memory and/or processing resources (e.g., mobile devices). Additionally, although a single client device 104 is shown, the client device 104 is also representative of a plurality of different devices, such as multiple servers utilized by a business to perform operations "over the cloud" as described in FIG. 10.

The client device 104 includes a communication module 130 having functionality to send communications, such as client-side packets, to the processing system 110 via the network 106. The client-side packets are processed by digital services 128 implemented by servers 126 of the servicer system 108. A result of which is referred to as a server-side packet that is received by the client device 104 via the network 106.

Conventional techniques for troubleshooting network communication problems of a service provider system 102 using software load balancers 112 typically result in inefficient and computationally expensive use of computational resources. This is because conventional techniques do not have an ability to track a packet's journey through a server system and therefore address issues involved in that journey. Accordingly, linked packet tracing techniques and systems for software load balancers 112 are described to trace a journey of a network packet from one device (e.g., the client device 104) to another (e.g., the server system 108) across a network.

In general, functionality, features, and concepts described in relation to the examples above and below are employed in the context of the example procedures described in this section. Further, functionality, features, and concepts described in relation to different figures and examples in this document are interchangeable among one another and are not limited to implementation in the context of a particular figure or procedure. Moreover, blocks associated with different representative procedures and corresponding figures herein are applicable together and/or combinable in different ways. Thus, individual functionality, features, and concepts described in relation to different example environments, devices, components, figures, and procedures herein are usable in any suitable combinations and are not limited to the particular combinations represented by the enumerated examples in this description.

Linked Packet Tracing

Figure 2:
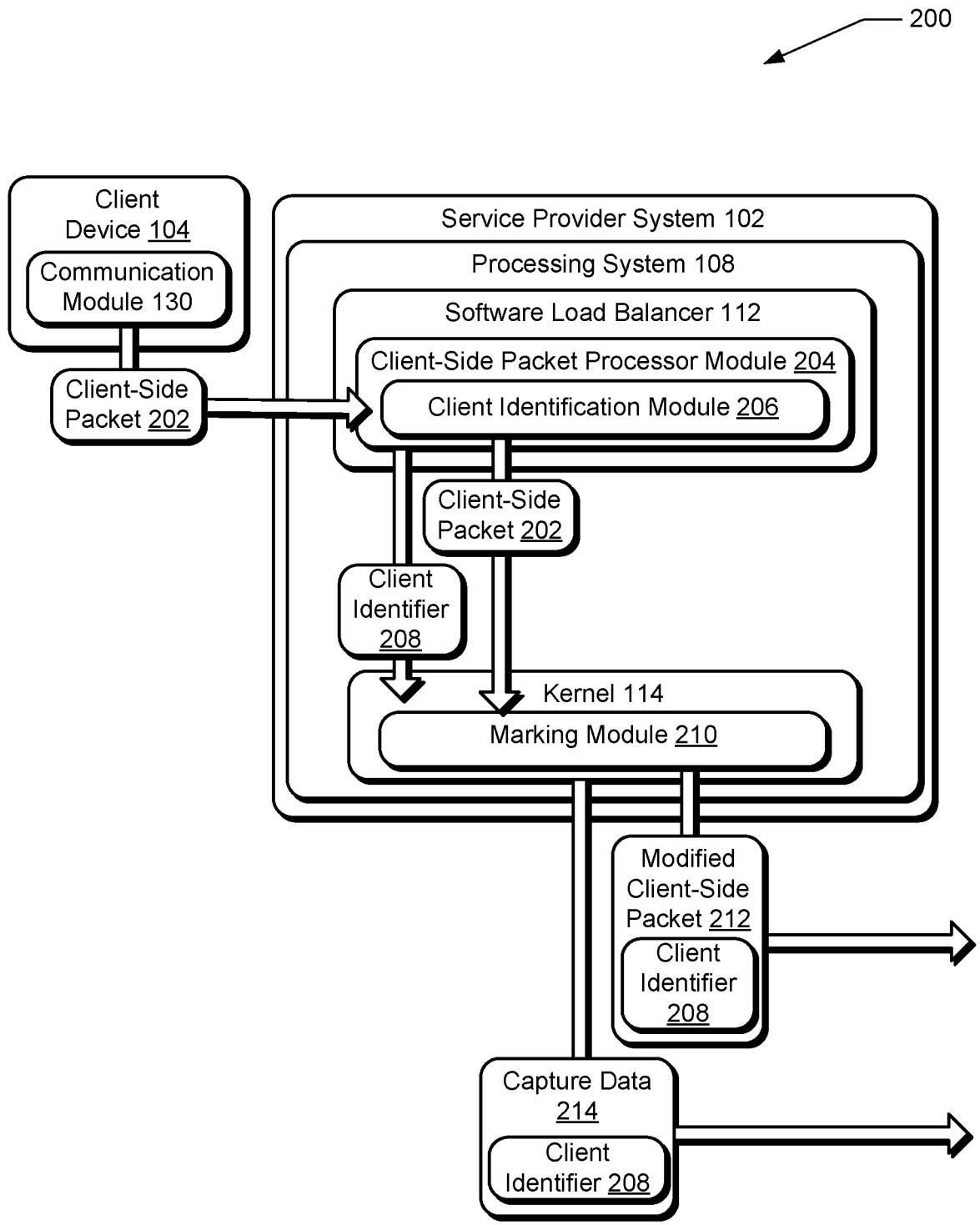
FIG. 2 depicts a system in an example implementation showing operation of a processing system of the service provider system of FIG. 1 in greater detail as generating a modified client-side packet from a client-side packet received from a client device by including a client identifier.
Figure 3:
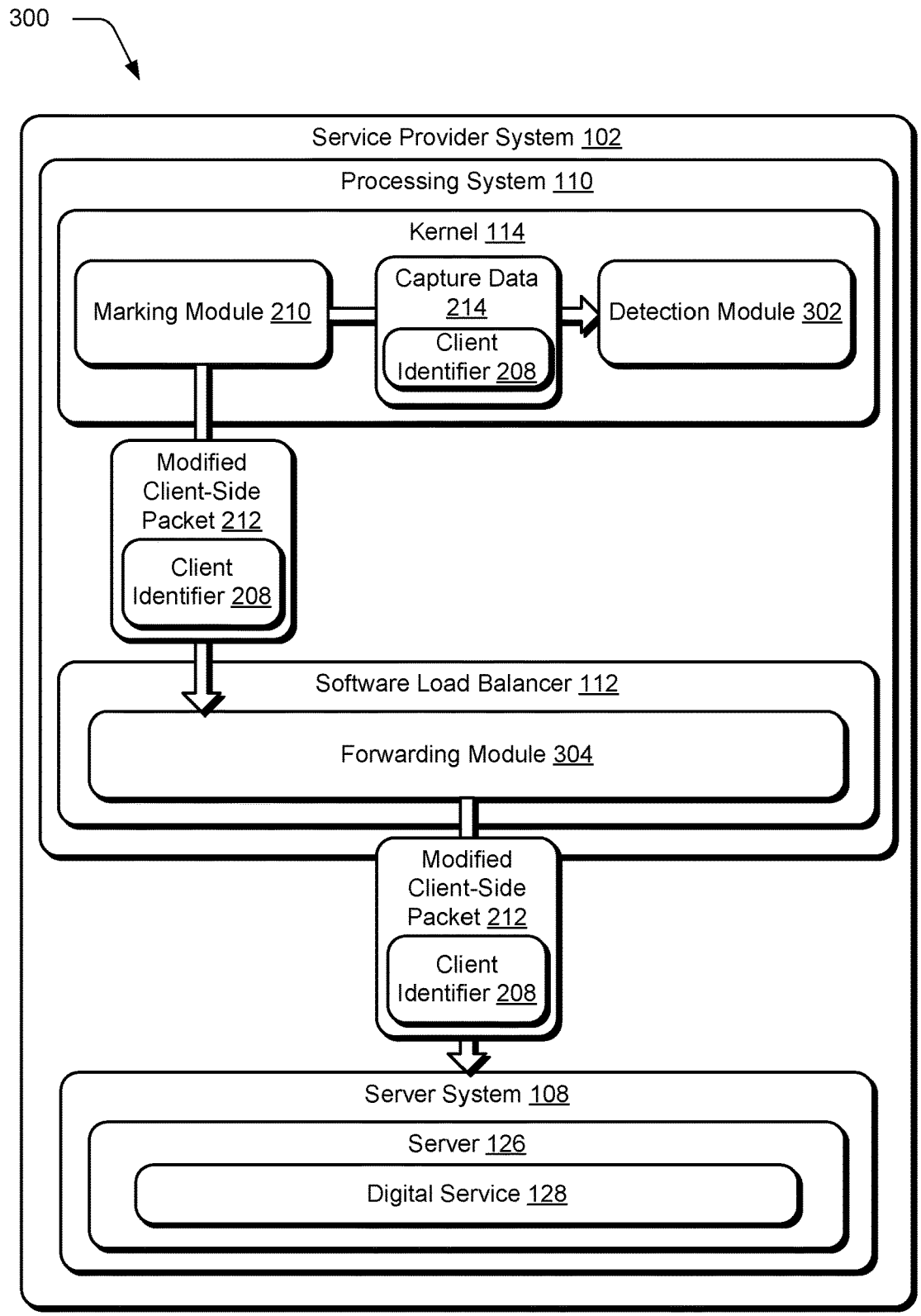
FIG. 3 depicts a system in an example implementation of passing capture data including a client identifier to a detection module responsive to the modification of the client-side packet of FIG. 2 and transmitting the modified client-side packet to a server system.
Figure 4:
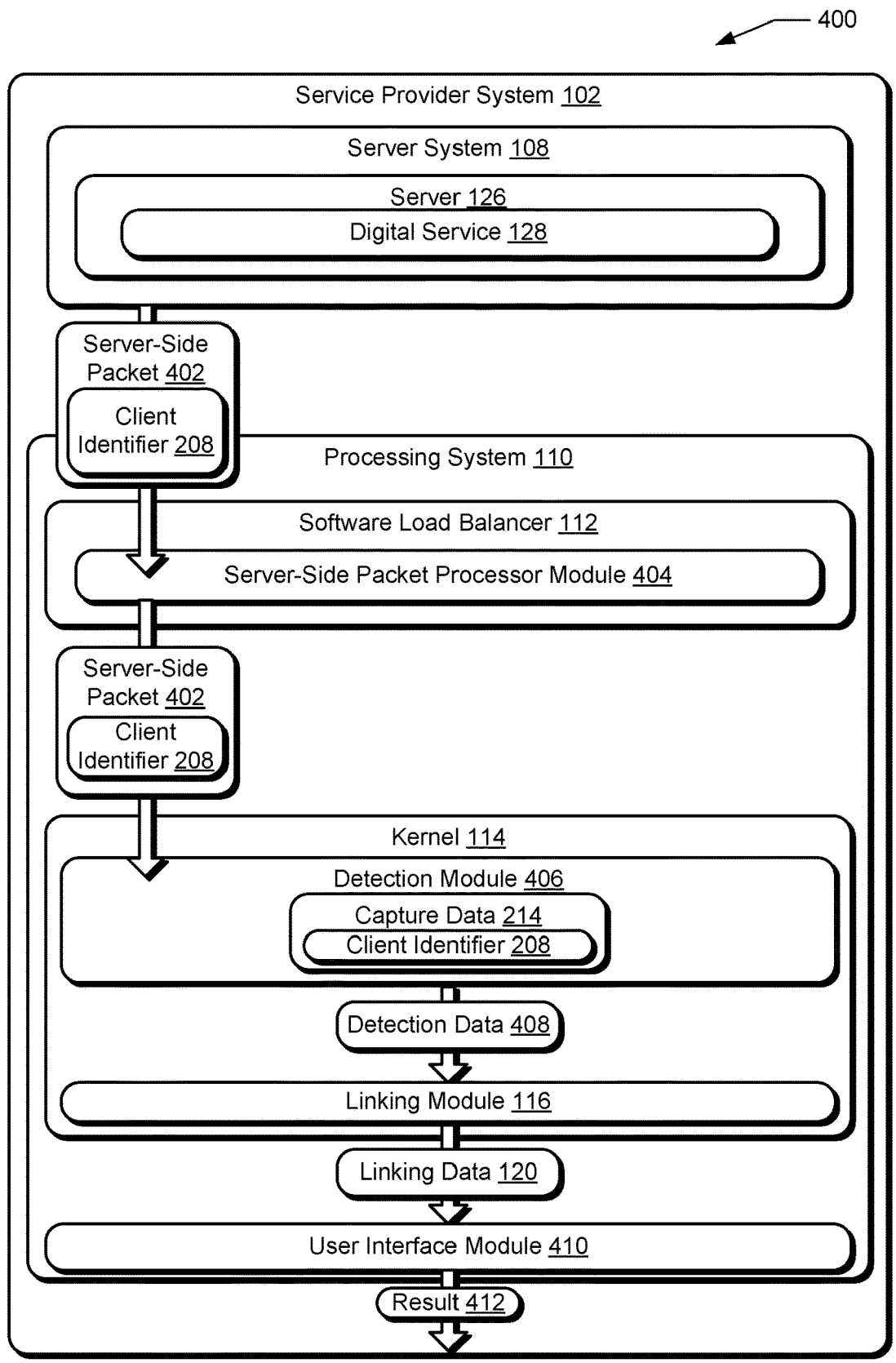
FIG. 4 depicts a system in an example implementation of receiving a server-side packet from the server system of FIG. 3 and linking the server-side packet to the modified client-side packet based on detecting that the server-side packet includes the client identifier of FIGS. 2 and 3.

FIG. 2 depicts a system 200 in an example implementation showing operation of a processing system 110 of the service provider system 102 of FIG. 1 in greater detail as generating a modified client-side packet 212 received from a client device 104 by including a client identifier 208. FIG. 3 depicts a system 300 in an example implementation of passing capture data 214 including a client identifier 208 to a detection module 302 responsive to the generation of the modified client-side packet 212 of FIG. 2 and transmitting the modified client-side packet 212 to a server system 108. FIG. 4 depicts a system 400 in an example implementation of receiving a server-side packet 402 from the server system 108 of FIG. 3 and linking the server-side packet 402 to the modified client-side packet 212 of FIG. 3 based on detecting that the server-side packet 402 includes the client identifier 208 of FIGS. 2 and 3.

Figure 5:
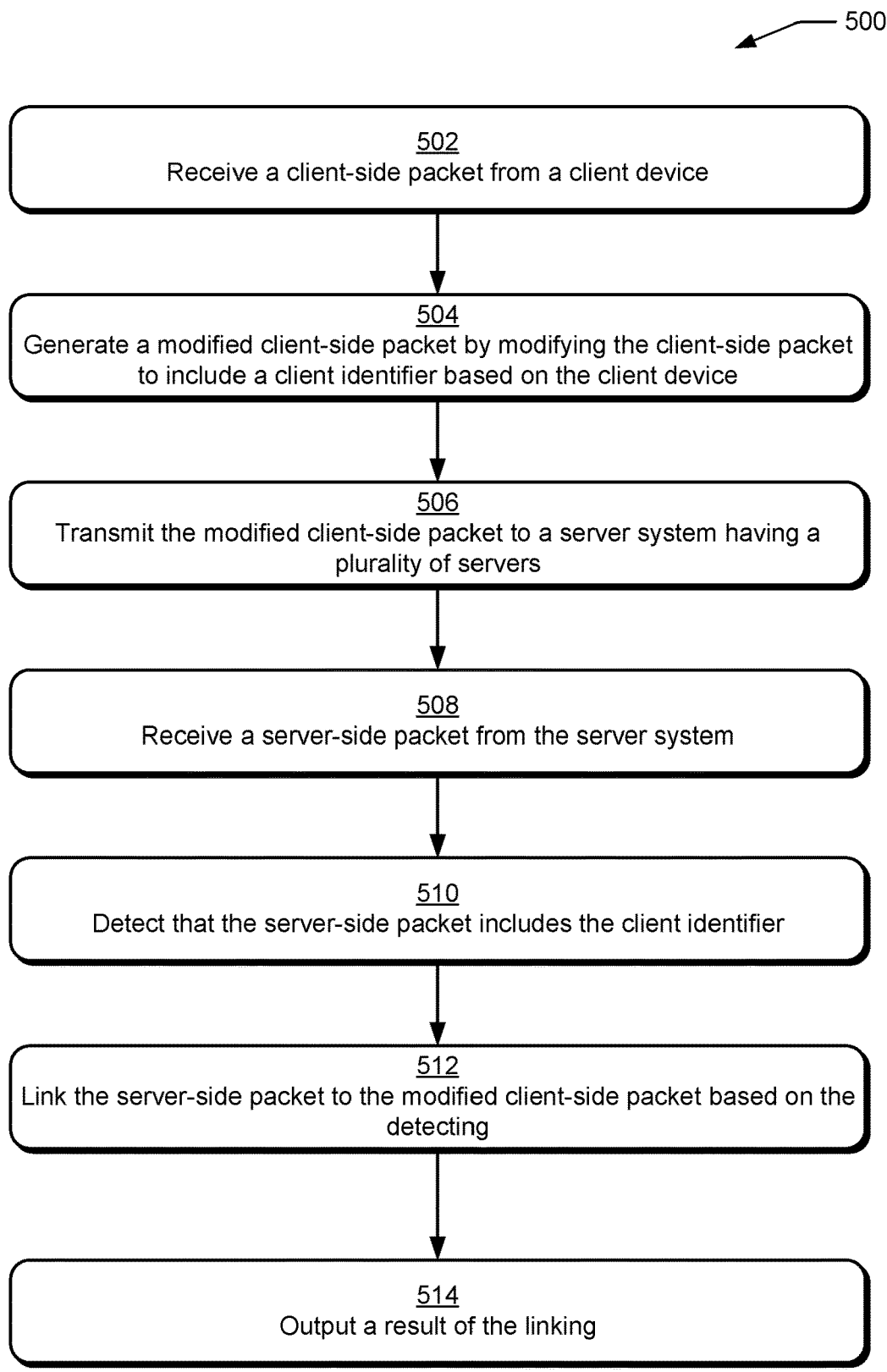
FIG. 5 is a flow diagram depicting a procedure in an example implementation of detecting that a server-side packet includes a same client identifier as the client identifier included in a modified client-side packet, and from this, linking the server-side packet to the modified client-side packet based on the detection and outputting a result of the linkage.
Figure 6:
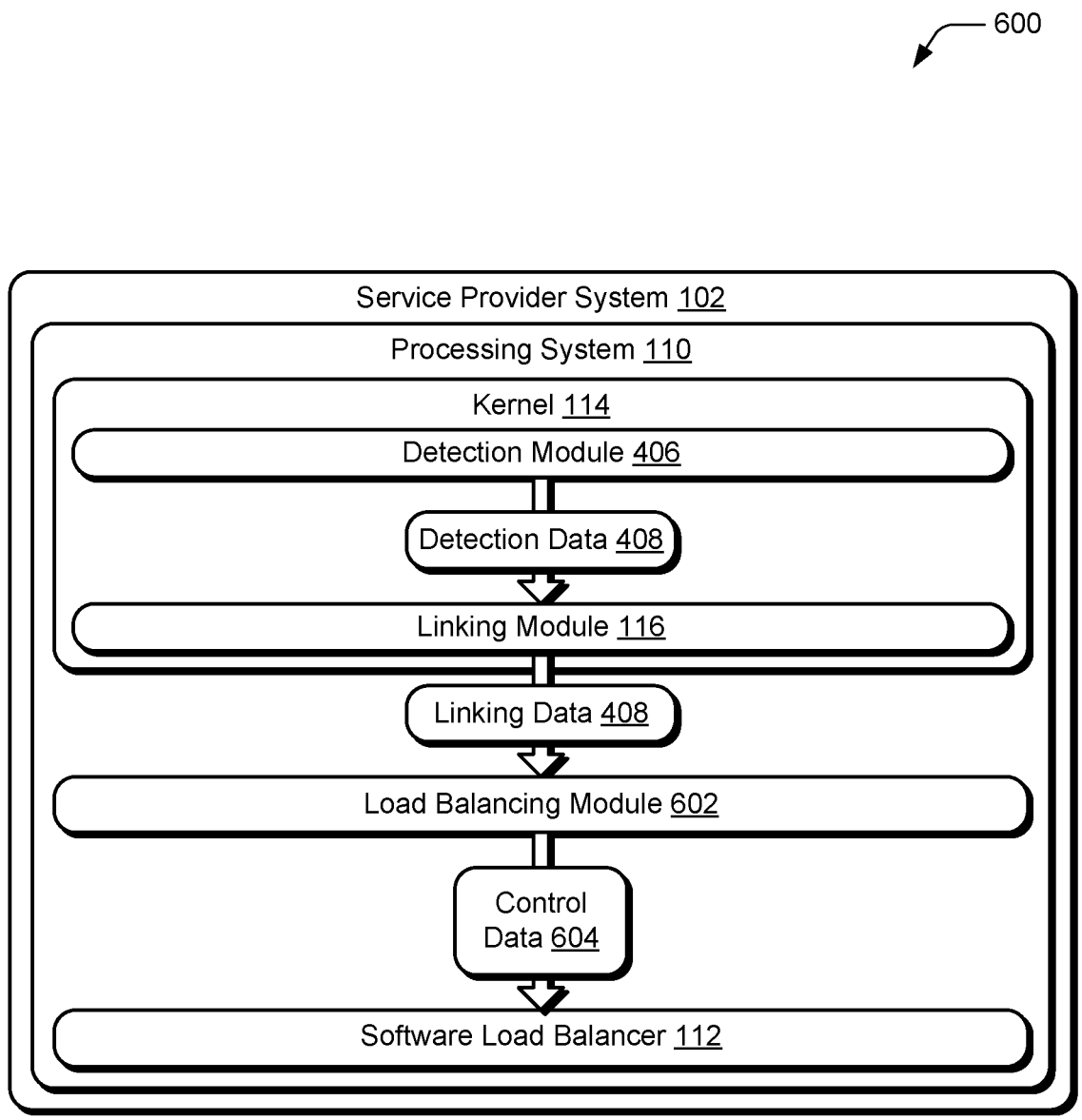
FIG. 6 depicts a system in an example implementation of linking a server-side packet to the modified client-side packet and controlling load balancing by a software load balancer based on the linkage.

FIG. 5 is a flow diagram depicting a procedure 500 in an example implementation of detecting that a server-side packet 402 includes a same client identifier 208 as the client identifier 208 included in a modified client-side packet 212, and from this, linking the server-side packet 402 to the modified client-side packet 212 based on the detecting and outputting a result 412 of the linking FIG. 6 depicts a system 600 in an example implementation of linking a server-side packet 402 to the modified client-side packet 212 based on detecting that the server-side packet 402 includes the client identifier 208 of FIGS. 2 and 3 and controlling load balancing by a software load balancer 112 based on the linking.

Figure 7:
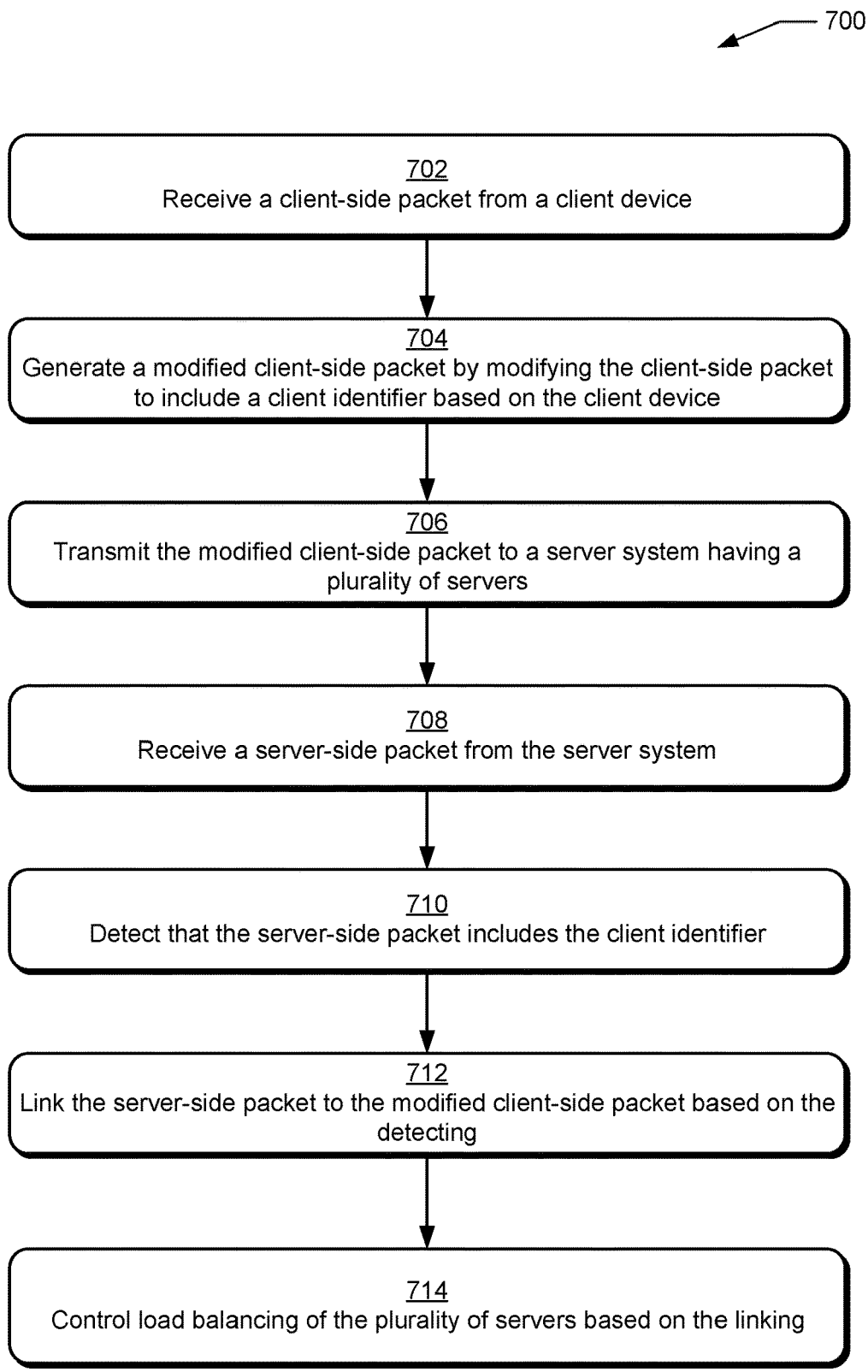
FIG. 7 is a flow diagram depicting a procedure in an example implementation of linking a server-side packet to a modified client-side packet and controlling load balancing of servers of a server system based on the linkage.
Figure 8:
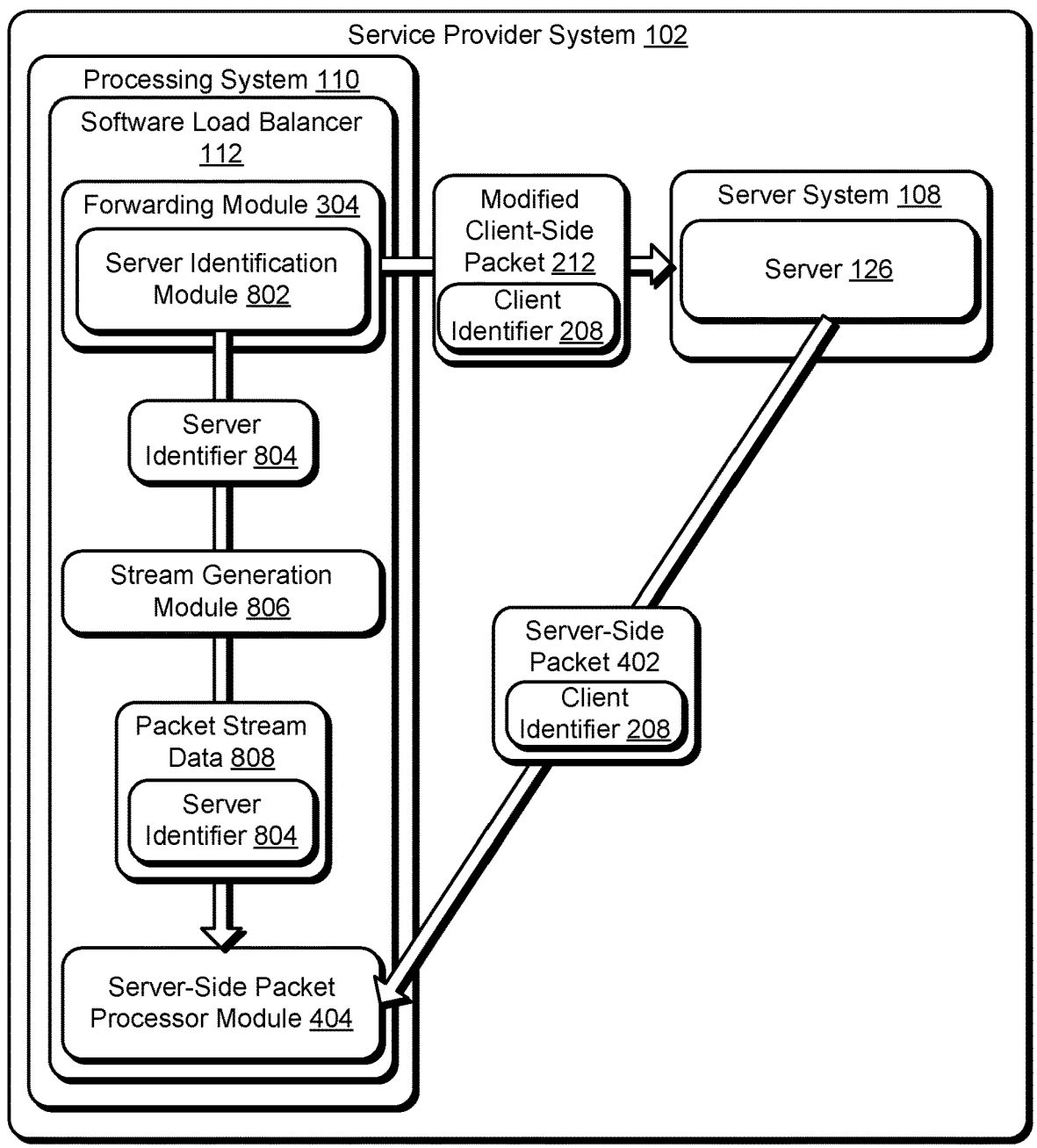
FIG. 8 depicts a system in an example implementation showing operation of a processing system of the service provider system of FIG. 1 in greater detail as exposing a server identifier of a server that a modified client-side packet is to be transmitted to, generating a packet stream based on the server identifier, and efficiently capturing server-side packets from the server via the packet stream.
Figure 9:
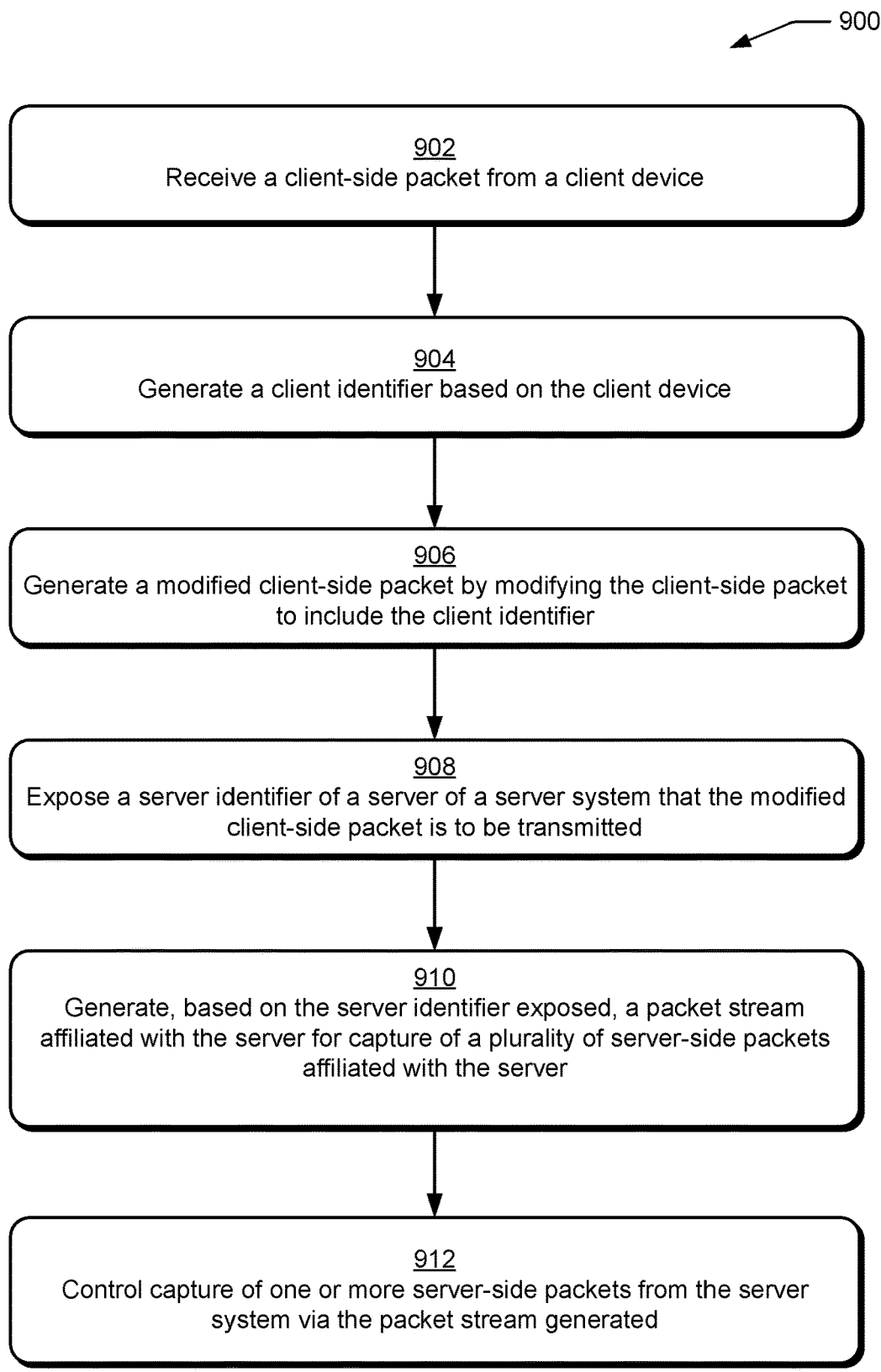

FIG. 7 is a flow diagram depicting a procedure 700 in an example implementation of detecting that a server-side packet 402 includes a same client identifier 208 as the client identifier 208 included in a modified client-side packet 212, and from this, linking the server-side packet 402 to the modified client-side packet 212 based on the detecting and controlling load balancing of servers of a server system 108 based on the linking FIG. 8 depicts a system 800 in an example implementation showing operation of a processing system 110 of the service provider system 102 of FIG. 1 in greater detail as exposing a server identifier 804 of a server 126 that a modified client-side packet 212 is being transmitted to, generating a packet stream based on the server identifier 804, and efficiently capturing server-side packets 402 from the server 126 via the packet stream. FIG. 9 is a flow diagram depicting a procedure 900 in an example implementation of controlling capture of one or more server-side packets 402 from a server system 108 by generating a packet stream affiliated with an exposed server identifier 804 of a server 126 that a modified client-side packet 212 is being transmitted to.

The following discussion describes techniques that are implementable utilizing the previously described systems and devices. Aspects of each of the procedures are implemented in hardware, firmware, software, or a combination thereof. The procedures are shown as a set of blocks that specify operations performed by one or more devices and are not necessarily limited to the orders shown for performing the operations by the respective blocks. In portions of the following discussion, reference will be made to FIGS. 1-9.

To begin in the illustrated example of FIG. 2, a client-side packet 202 is received by a client-side packet processor module 204 from a client device 104 (blocks 502, 702, and 902). The client-side packet processor module 204 is configured to process client-side packets 202 that are received from client devices 104. In FIG. 2, the software load balancer 112 of the processing system 110 includes the client-side packet processor module 204. In one example, the client-side packet is received at a Virtual IP address configured on the processing system. In another example, the client-side packet processor module 204 includes a network filter that the client-side packet 202 goes through while being processed.

The client-side packet processor module 204 includes a client identification module 206 that is configured to generate a client identifier 208. The client identifier 208 is generated based on the client device 104 by the client identification module 206 (blocks 504, 704, and 904). In one example, the client identifier is a client IP address or a client port based on the client device, examples of which are further described below.

As depicted in FIG. 2, the software load balancer 112 passes the client-side packet 202 and the client identifier 208 to a kernel 114. The kernel 114 is configurable as a variety of types of kernel 114, such as: a monolithic kernel, a microkernel, a hybrid kernel, a Linux kernel, or so forth. Additionally, the software load balancer 112 can pass instructions to store the client identifier 208 in the kernel 114. For instance, in a socket buff of the kernel 114 (e.g., skbuff). By way of example, the processing system 110 can replace a kernel function of the kernel 114 with instructions to store values in a socket buff of the kernel 114. In another implementation where the client identifier 208 is stored in the socket buff of the kernel 114, the processing system utilizes a live patch module to store the client identifier 208 in the socket buff.

The kernel 114 includes functionality to also generate a modified client-side packet 212. This is referred to as a modified client-side packet 212, the modification of which is based on the client-side packet and the client identifier 208. To continue this example depicted in FIG. 2, the marking module 210 of the kernel 114 receives the client-side packet 202 for modification. The marking module 210 includes functionality to use a client identifier 208 to generate a modified client-side packet 212 that includes the client identifier 208. In one instance, the marking module 210 uses a client identifier 208 stored in a socket buff of the kernel 114 to generate the modified client-side packet 212.

In a first example, the marking module 210 generates a modified client-side packet 212 by adding a new field to the client-side packet 202 to include the client identifier 208. For instance, a new TCP option field or a new IP option field.

The TCP option field of a TCP packet includes zero or thirty two-bit words and provides a way to deal with limitation of the original header of the TCP packet; TCP header size varies in the range of twenty to sixty bytes, where forty bytes is because of option fields, which is located at the end of the TCP header. Conventional TCP options are maximum segment size ("MSS"), window scaling, selective acknowledgement ("SACK"), timestamp, and no options ("NOP"), and conventionally include information relevant to those options. By way of example, a client device 104 conventionally uses the options field to declare an MSS, if applicable.

An IP option field is an optional field of an IP packet that is included in a header of the IP packet. By way of example, an IP option field is included in an IPv4 header used when the value of Internet Header Length is set to greater than five. The IP header includes information such as the IP version, the packet's length, the source, and the destination, and provides essential data needed to transmit the data. The IP option field typically contains values and settings related with security, record route and time stamp, or so forth.

In one example shown below, a client identifier 202 that is a client port is added as a new TCP option field.
opt.code=IPOPT_SID;
opt.len=4;
opt.c_port=htons((_u16)(skb→secmark));

In a second example, the marking module 210 generates a modified client-side packet 212 by modifying an existing field to the client-side packet 202 to include the client identifier 208. For instance, modifying an existing IP ToS field. The IP ToS field is a field that is included in an IP packet header. For example, as a second byte of a IPv4 header. The IP ToS field can be leveraged to indicate throughput type, reliability type, delay type, and cost. In one example shown below, a client identifier 208 that is a client IP address corresponding the client device 104 is added to an existing IP ToS field of the client-side packet 202.
iph→tosl=0×e0;

The kernel 114 is also configured to generate instructions to capture server-side packets that include the client identifier 208 as capture data 214. Continuing the example of FIG. 2 above in FIG. 3, the marking module 210 of the kernel 114 passes the capture data 214 including the client identifier 208 to a detection module 302 of the kernel 114. Receipt of the capture data 214 causes the detection module 302 to detect server-side packets that include the client identifier 208 for capture.

Further shown in FIG. 3, the software load balancer 112 receives, via a forwarding module 304, the modified client-side packet 212 from the marking module 210. The forwarding module transmits the modified client-side packet 212 to a server system 108 having servers (blocks 506, 706, and 906). For instance, server 126.

Continuing the example of FIG. 3 above in FIG. 4, the server system 108 processes the modified client-side packet 212 and outputs a server-side packet 402 that includes the client identifier 208. The server system 108 then transmits the server-side packet 402 to a server-side packet processor module 404 of the software load balancer 112. As depicted in FIG. 4, the server-side packet processor module 404 receives the server-side packet 402 from the server system 108 (blocks 508 and 708). In one example, the server-side packet processor module 404 receives the server-side packet 402 based on a called API, such as libpcap.

The server-side packet processor module is employed to process the server-side packet 402 and pass it to the detection module 406 of the kernel 114. As depicted in FIG. 3, the detection module 406 employs capture data 214 including the client identifier 208 to detect that the server-side packet 402 includes the client identifier 208 (blocks 510 and 710). This detection is passed from the detection module to the linking module 116 as detection data 408.

Additionally, or alternatively, the detection module 406 is configured to filter the server-side packet 402 based on the detecting. For instance, filtering the server-side packet 402 based on detecting that the client identifier 208 is a TCP sequence number.

Based on the detection data 408, the linking module 116 links the server-side packet 402 to the modified client-side packet 212 of FIGS. 2 and 3 (blocks 512 and 712). As depicted in FIG. 4, the linking module 116 links the server-side packet 402 to the modified client-side packet 212 of FIGS. 2 and 3 as linking data 120. In an implementation, the linking module 116 maps the communication data of the client-side packet 202, the modified client-side packet 212, and the server-side packet 402 between the client device 104, the software load balancer 112, and the server system 108 as part of the linking data 120. Responsive to the linkage, the linking module 116 passes the linking data 120 to the user interface module 410 of the processing system 110.

The user interface module 410 is then employed to output a result 412 of the linking data 120 (block 514). For instance, a client packet ID 122 associated with the client-side packet 202, a server packet identifier 124 associated with the server-side packet 402, digital content depicting the packet traces, or so forth. In one example, the result 412 includes traced connection data of the client-side packet 202, the modified client-side packet 212, and the server-side packet 402 between at least the client device 104 and the server system 108. In another example, the result 412 of the linking data 120 includes packet traces of the client-side packet 202, the modified client-side packet 212, and the server-side packet 402 between the client device 104, the software load balancer 112, and the server system 108. In this way, packet traces are efficiently linked, thus tracing the journey of a client-side packet 202 from a client device 104 to a software load balancer 112 of a service provider system 102 to a server system 108, and so forth, across a network of a service provider system 102. This enables more efficient identification of devices within a service provider system that may not be performing optimally. This also results in substantially increased efficiency in network analysis and computational resource consumption.

In an implementation depicted in FIG. 6, the linking module 116 of FIG. 4 passes the linking data 120 to a load balancing module 602. The load balancing module 602 is employed to control load balancing of servers of the server system 108 via control data 604 (block 714). The load balancing module 602 passes such control data 604 to the software load balancer 112, thus controlling load balancing of servers of the server system 108 via control data 604. In this way, a service provider system 102 using software load balancers 112 is empowered with more efficient computational resource consumption and delegation. For instance, the load balancing module controls the load balancing by routing traffic to healthy servers of the server system, by not accepting any new handshake requests from client devices, by going offline when doing so will not interrupt an established connection, or so forth. In one example, when the linking data 120 indicates that there is an issue with the server-side connection of a particular server 126 of the server system 108, the software load balancer 112 will cease to transmit packets to the problematic server 126 responsive to the control data 604.

In an implementation depicted in FIG. 8, a server identification module 802 of the forwarding module 304 is employed to expose a server identifier 804 of a server 126 that the modified client-side packet 212 of FIG. 2 is to be transmitted (block 908). For instance, a server IP address based on the server 126, a server port based on the server 126, a destination address of the modified client-side packet 212, a destination port of the modified client-side packet 212, or so forth. The server identification module 802 passes the server identifier 804 to a stream generation module 806 that is employed to generate, based on the server identifier 804 and as packet stream data 808, a packet stream affiliated with the server 126 for capture of server-side packets 402 affiliated with the server 126 (block 910). Thus, the stream generation module 806 passes the packet stream data 808 including the server identifier 804 to the server-side packet processor module 404 of FIG. 4, configuring the server-side packet processor module 404 to control capture of server-side packets 402 received from the server system 108 via the packet stream generated by the packet stream data 808 (block 912). In this way, server-side packets 402 are efficiently and dynamically captured from a server 126 instead of capturing extraneous server-side packets 402 from a server system 108. This enables more efficient identification of devices within a service provider system that may not be performing optimally. This also results in substantially increased efficiency in network analysis and computational resource consumption.

Example System and Device

Figure 10:
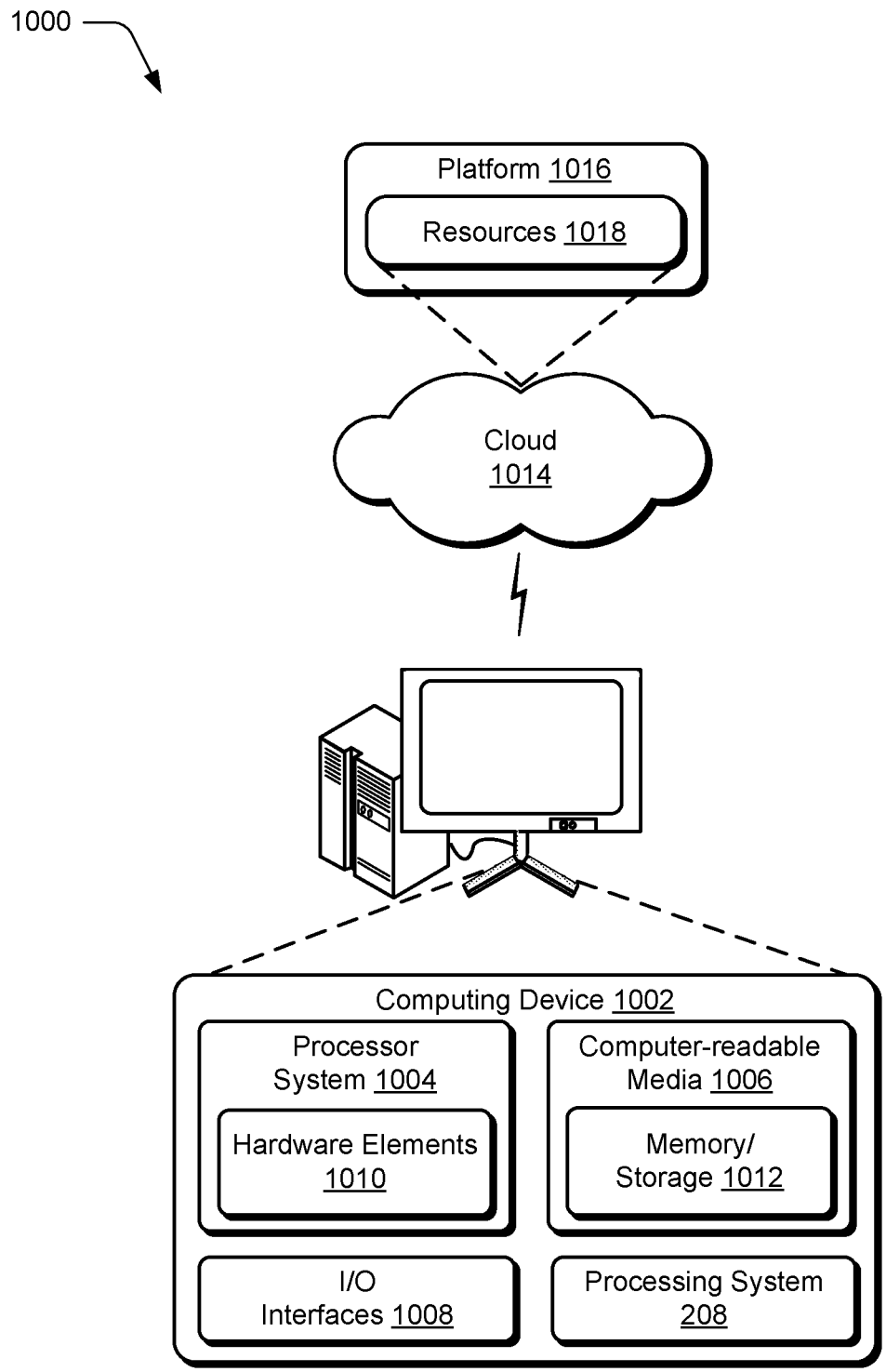
FIG. 10 illustrates an example system including various components of an example device that can be implemented as any type of computing device as described and/or utilize with reference to FIGS. 1-9 to implement embodiments of the techniques described herein.

FIG. 10 illustrates an example system generally at 1000 that includes an example computing device 1002 that is representative of one or more computing systems and/or devices that implement the various techniques described herein. This is illustrated through inclusion of the processing system 110. The computing device 1002 is configurable, for example, as a server of a service provider, a device associated with a client (e.g., a client device), an on-chip system, and/or any other suitable computing device or computing system.

The example computing device 1002 as illustrated includes a processor system 1004, one or more computer-readable media 1006, and one or more I/O interface 1008 that are communicatively coupled, one to another. Although not shown, the computing device 1002 further includes a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processor system 1004 is representative of functionality to perform one or more operations using hardware. Accordingly, the processor system 1004 is illustrated as including hardware element 1010 that is configurable as processors, functional blocks, and so forth. This includes implementation in hardware as an application specific integrated circuit or other logic device formed using one or more semiconductors. The hardware elements 1010 are not limited by the materials from which they are formed or the processing mechanisms employed therein. For example, processors are configurable as semiconductor(s) and/or transistors (e.g., electronic integrated circuits (ICs)). In such a context, processor-executable instructions are electronically-executable instructions.

The computer-readable storage media 1006 is illustrated as including memory/storage 1012. The memory/storage 1012 represents memory/storage capacity associated with one or more computer-readable media. The memory/storage 1012 includes volatile media (such as random access memory (RAM)) and/or nonvolatile media (such as read only memory (ROM), Flash memory, optical disks, magnetic disks, and so forth). The memory/storage 1012 includes fixed media (e.g., RAM, ROM, a fixed hard drive, and so on) as well as removable media (e.g., Flash memory, a removable hard drive, an optical disc, and so forth). The computer-readable media 1006 is configurable in a variety of other ways as further described below.

Input/output interface(s) 1008 are representative of functionality to allow a user to enter commands and information to computing device 1002, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., employing visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the computing device 1002 is configurable in a variety of ways as further described below to support user interaction.

Various techniques are described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques are configurable on a variety of commercial computing platforms having a variety of processors.

An implementation of the described modules and techniques is stored on or transmitted across some form of computer-readable media. The computer-readable media includes a variety of media that is accessed by the computing device 1002. By way of example, and not limitation, computer-readable media includes "computer-readable storage media" and "computer-readable signal media."

"Computer-readable storage media" refers to media and/or devices that enable persistent and/or non-transitory storage of information in contrast to mere signal transmission, carrier waves, or signals per se. Thus, computer-readable storage media refers to non-signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media include but are not limited to RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and are accessible by a computer.

"Computer-readable signal media" refers to a signal-bearing medium that is configured to transmit instructions to the hardware of the computing device 1002, such as via a network. Signal media typically embodies computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 1010 and computer-readable media 1006 are representative of modules, programmable device logic and/or fixed device logic implemented in a hardware form that are employed in some embodiments to implement at least some aspects of the techniques described herein, such as to perform one or more instructions. Hardware includes components of an integrated circuit or on-chip system, an application-specific integrated circuit (ASIC), a field-programmable gate array (FPGA), a complex programmable logic device (CPLD), and other implementations in silicon or other hardware. In this context, hardware operates as a processing device that performs program tasks defined by instructions and/or logic embodied by the hardware as well as a hardware utilized to store instructions for execution, e.g., the computer-readable storage media described previously.

Combinations of the foregoing are also be employed to implement various techniques described herein. Accordingly, software, hardware, or executable modules are implemented as one or more instructions and/or logic embodied on some form of computer-readable storage media and/or by one or more hardware elements 1010. The computing device 1002 is configured to implement particular instructions and/or functions corresponding to the software and/or hardware modules. Accordingly, implementation of a module that is executable by the computing device 1002 as software is achieved at least partially in hardware, e.g., through use of computer-readable storage media and/or hardware elements 1010 of the processor system 1004. The instructions and/or functions are executable/operable by one or more articles of manufacture (for example, one or more computing devices 1002 and/or processor systems 1004) to implement techniques, modules, and examples described herein.

The techniques described herein are supported by various configurations of the computing device 1002 and are not limited to the specific examples of the techniques described herein. This functionality is also implementable all or in part through use of a distributed system, such as over a "cloud" 1014 via a platform 1016 as described below.

The cloud 1014 includes and/or is representative of a platform 1016 for resources 1018. The platform 1016 abstracts underlying functionality of hardware (e.g., servers) and software resources of the cloud 1014. The resources 1018 include applications and/or data that can be utilized while computer processing is executed on servers that are remote from the computing device 1002. Resources 1018 can also include services provided over the Internet and/or through a subscriber network, such as a cellular or Wi-Fi network.

The platform 1016 abstracts resources and functions to connect the computing device 1002 with other computing devices. The platform 1016 also serves to abstract scaling of resources to provide a corresponding level of scale to encountered demand for the resources 1018 that are implemented via the platform 1016. Accordingly, in an interconnected device embodiment, implementation of functionality described herein is distributable throughout the system 1000. For example, the functionality is implementable in part on the computing device 1002 as well as via the platform 1016 that abstracts the functionality of the cloud 1014.

CONCLUSION

Although the invention has been described in language specific to structural features and/or methodological acts, it is to be understood that the invention defined in the appended claims is not necessarily limited to the specific features or acts described. Rather, the specific features and acts are disclosed as example forms of implementing the claimed invention.

What is claimed is:

1. A system comprising:
a client-side packet processor module implemented at least partially in hardware of a computing device to receive a client-side packet from a client device;
a client identification module implemented at least partially in the hardware of the computing device to generate a client identifier based on the client device;
a marking module implemented at least partially in the hardware of the computing device to generate a modified client-side packet by modifying the client-side packet to include the client identifier;
a server identification module implemented at least partially in the hardware of the computing device to expose a server identifier of a server of a server system that the modified client-side packet is to be transmitted;
a stream generation module implemented at least partially in the hardware of the computing device to generate, based on the server identifier exposed, a packet stream affiliated with the server for capture of a plurality of server-side packets affiliated with the server; and
a server-side packet processor module implemented at least partially in the hardware of the computing device to control capture of one or more server-side packets from the server system via the packet stream generated.

2. The system of claim 1, further comprising:
a forwarding module implemented at least partially in the hardware of the computing device to transmit the modified client-side packet having the client identifier to the server of the server system;
a detection module implemented at least partially in the hardware of the computing device to detect that the server-side packet includes the client identifier;
a linking module implemented at least partially in the hardware of the computing device to link the server-side packet to the modified client-side packet based on the detecting; and
a user interface module implemented at least partially in the hardware of the computing device to output a result of the linking.

3. The system of claim 1, wherein the client identifier is a client IP address or a client port based on the client device.

4. A method implemented by a computing device, the method comprising:
receiving, by the computing device, a client-side packet from a client device;
generating, by the computing device, a client identifier based on the client device;
generating, by the computing device, a modified client-side packet by modifying the client-side packet to include the client identifier;
exposing, by the computing device, a server identifier of a server of a server system that the modified client-side packet is to be transmitted;
generating, by the computing device, based on the server identifier exposed, a packet stream affiliated with the server for capture of a plurality of server-side packets affiliated with the server; and
controlling, by the computing device, capture of one or more server-side packets from the server system via the packet stream generated.

5. The method of claim 4, further comprising:
replacing, by the computing device, a kernel function of a kernel with instructions to store values in a socket buff of the kernel; and
storing, by the computing device, in the socket buff of the kernel, the client identifier.

6. The method of claim 4, wherein the client identifier is a client IP address.

7. The method of claim 4, wherein the client identifier is a client port based on the client device.

8. The method of claim 4, wherein the generating of the modified client-side packet includes modifying an existing field of the client-side packet to include the client identifier.

9. The method of claim 8, wherein the existing field of the client-side packet is an IP ToS field.

10. The method of claim 4, wherein the generating of the modified client-side packet includes adding a new field to the client-side packet to include the client identifier.

11. The method of claim 10, wherein the new field of the client-side packet is a TCP option field.

12. The method of claim 4, further comprising:
transmitting, by the computing device, the modified client-side packet having the client identifier to the server of the server system;
detecting, by the computing device, that the server-side packet includes the client identifier;
linking, by the computing device, the server-side packet to the modified client-side packet based on the detecting; and
outputting, by the computing device, a result of the linking.

13. One or more non-transitory computer-readable storage media comprising instructions stored that, responsive to execution by a computing device, causes the computing device to perform operations including:
receiving a client-side packet from a client device;
generating a client identifier based on the client device;
generating a modified client-side packet by modifying the client-side packet to include the client identifier;
exposing a server identifier of a server of a server system that the modified client-side packet is to be transmitted;
generating based on the server identifier exposed, a packet stream affiliated with the server for capture of a plurality of server-side packets affiliated with the server; and controlling capture of one or more server-side packets from the server system via the packet stream generated.

14. The one or more non-transitory computer-readable storage media of claim 13, wherein the client identifier is a client IP address.

15. The one or more non-transitory computer-readable storage media of claim 13, wherein the client identifier is a client port based on the client device.

16. The one or more non-transitory computer-readable storage media of claim 13, wherein the generating of the modified client-side packet includes modifying an existing field of the client-side packet to include the client identifier.

17. The one or more non-transitory computer-readable storage media of claim 16, wherein the existing field of the client-side packet is an IP ToS field.

18. The one or more non-transitory computer-readable storage media of claim 13, wherein the generating of the modified client-side packet includes adding a new field to the client-side packet to include the client identifier.

19. The one or more non-transitory computer-readable storage media of claim 18, wherein the new field of the client-side packet is a TCP option field.

20. The one or more non-transitory computer-readable storage media of claim 13, further comprising: transmitting the modified client-side packet having the client identifier to the server of the server system; detecting that the server-side packet includes the client identifier; linking the server-side packet to the modified client-side packet based on the detecting; and outputting a result of the linking.

\* \* \* \* \*